United States Patent [19]

Fowler

[11] Patent Number: 4,754,283

[45] Date of Patent: Jun. 28, 1988

[54] CODELESS GPS SONDE

[75] Inventor: Clarence W. Fowler, Elgin, Tex.

[73] Assignee: Tracor Aerospace Austin, Inc., Austin, Tex.

[21] Appl. No.: 875,102

[22] Filed: Jun. 17, 1986

[51] Int. Cl.$^4$ .......................... G01S 3/02; G01S 13/58; H04L 27/30

[52] U.S. Cl. ................................... 342/461; 342/104; 342/352; 375/1; 380/34

[58] Field of Search ................. 342/461, 418, 26, 104, 342/192, 352, 356; 375/1; 380/34

[56] References Cited

U.S. PATENT DOCUMENTS

| | | |
|---|---|---|
| 4,114,155 | 9/1978 | Raab . |
| 4,170,776 | 10/1979 | MacDoran et al. . |
| 4,215,345 | 7/1980 | MacDoran et al. . |
| 4,426,712 | 1/1984 | Gorski-Popiel . |
| 4,445,118 | 4/1984 | Taylor et al. . |
| 4,445,120 | 4/1984 | Rosenthal . |
| 4,453,165 | 6/1984 | Maine . |
| 4,457,006 | 6/1984 | Maine . |
| 4,463,357 | 7/1984 | MacDoran et al. . |
| 4,468,793 | 8/1984 | Johnson et al. . |
| 4,485,383 | 11/1984 | Maher . |

OTHER PUBLICATIONS

MacDoran et al., "Codeless GPS Systems for Positioning of Offshore Platforms and 3D Seismic Surveys," Navigation: Journal of the Institute of Navigation; vol. 31, No. 2 (Summer 1984).

MacDoran et al., "Codeless GPS Positioning Offers Sub-Meter Accuracy," Sea Technology (Oct. 1984).

ISTAC-Series Marine Positioning Sensor Technical Data Sheet, Istac, Inc. (Dec. 11, 1984).

Primary Examiner—Theodore M. Blum
Assistant Examiner—Gregory C. Issing
Attorney, Agent, or Firm—Michael T. McLemore

[57] ABSTRACT

Windfinding apparatus is described in which receiver processing of the Global Positioning System (GPS) signals is without knowledge of the spread spectrum codes. The apparatus receiver ignores the bi-phase code and recovers the carrier frequency of all satellites in view of the receiving antenna. Two of these receivers are used in a windfinding system. One of the receivers is located on the ground at a known latitude and longitude. The other receiver is placed on a weather balloon sonde and launched into the atmosphere. A telemetry transmitter aboard the sonde transmits a signal that contains the GPS carrier frequency information to the ground-based telemetry receiver. The telemetry receiver output and the local codeless GPS receiver feed a set of tracking filters. The filtered signals are evaluated to obtain a measurement of the difference between the local GPS receiver carrier frequency and the sonde GPS receiver carrier frequency caused by the velocity of the sonde relative to the ground-based receiver (i.e., doppler effect). The wind velocity is computed based on knowledge of the doppler of the sonde GPS receiver and known GPS satellite positions. The sonde velocity is computed as a three dimensional vector. This vector can then be integrated to obtain the x distance, y distance and z altitude from the sonde launch point.

11 Claims, 3 Drawing Sheets

CODELESS GPS SONDE

BACKGROUND OF THE INVENTION

The present invention relates to systems for positioning and navigation based upon the reception of signals transmitted from satellites orbiting the earth. More particularly, the present invention relates to a system for recovering the carrier frequency from direct sequence spread spectrum satellite signals without knowledge of the said spread spectrum codes and using the carrier frequencies from several geometrically spaced signal sources provided by the Global Positioning System (hereinafter referred to as GPS) to compute the velocity of a balloon borne sonde.

The GPS will consist of eighteen or more satellites in 12 hour circular orbits at a range of approximately 11,000 nautical miles above the earth. The orbital positions of these satellites has been selected to maximize the probability that at least four satellites with suitable geometry for navigation will be in view at all times and positions on the earth. The signals emitted from these satellites are of the same carrier frequency. Each satellite has a different spread spectrum access code for both a clear acquisition (C/A) and a precision (P) code. The C/A code is a pseudorandom string of ones and zeros applied to a device which controls the carrier phase in 180 degree increments. This technique is known as bi-phase direct sequence spread spectrum at a 1.023 MHz rate. The P code is much longer in length and is applied at a 10.23 MHz rate. Details of the NAVSTAR/GPS are given in NAVIGATION: Journal of the Institution of Navigation, Vol. 25, No. 2, December 1978.

The standard GPS navigation receiver must generate a replica of the transmitted code for control of an internal phase switch and synchronize the code in time with the code received at its antenna in order to recover the carrier frequency. The code time with respect to an internal clock is measured for four satellites and used for determining the position of the GPS receiver on the earth. See, for example, U.S. Pat. Nos. 4,457,006 and 4,114,155.

Present windfinding systems make use of inexpensive disposable LORAN and OMEGA receivers installed in sondes which measure barometric pressure, temperature and humidity. See, for example, U.S. Pat. No. 4,445,120. The U.S. Government plans to discontinue the LORAN and OMEGA transmissions some time after the GPS navigation satellites are placed in orbit. The GPS system will provide world wide navigation with better accuracy and lower cost than LORAN or OMEGA. The development of a GPS windfinding system is then necessary for continued wind verses altitude measurements. Such systems desirably should have a sonde of minimum cost because it is disposable. There is the need for a receiver which avoids the expense and complexity of code generation and synchronization for the purposes of finding differential positions and velocity.

SUMMARY OF THE INVENTION

The apparatus of the present invention provides a relatively low cost implementation of a GPS windfinding radiosonde. The apparatus includes a codeless receiver which uses the GPS signal to debandspread itself. The GPS signal is received on an antenna, amplified and filtered to eliminate out-of-band interference. The resulting signal is then processed to remove the biphase code.

For processing the signal enters a quadrature mixer having four ports. A first port accepts the input signal and splits it into two signal paths with equal phase. A second port accepts a local oscillator signal and splits it into two paths with a 90° difference in phase. The four signals are then paired and multiplied in a mixer. The result of this multiplication is a frequency conversion with the difference in the frequencies of the paired signals appearing at the two output ports (i.e., third and forth ports). The two output signals are 90° out of phase and remain so independent of the frequency of the output signals.

The output signals of the quadrature conversion are passed through separate video amplifiers having sufficient bandwidth to pass the spread spectrum modulation components at baseband. The bandwidth required for the C/A code is 1.023 MHz for baseband. The signals at the output of the video amplifiers are composed of noise and signal components. The signal components are 90° out-of-phase, but the noise components are non-correlated. Thus, after multiplication, the noise can be filtered and will not have a DC (direct current) component.

Multiplication of the video amplifier output signals removes the 180° spread spectrum code from the GPS carrier frequency. The signal at the output of the multiplier can now be filtered to a bandwidth which will pass two times the expected doppler frequency shift due to the satellite motion. The doppler shift from the satellites is approximately ±5 KHz. This permits the bandwidth to be reduced to 20 KHz for transmission to the ground-based unit.

In the ground-based unit the signals are filtered and compared with the signals from a ground-based codeless receiver. The difference in the frequencies of the signals received by the two codeless receivers is primarily due to the difference in the velocities of the ground-based unit and the balloon borne receiver.

The ground-based unit further includes a standard GPS receiver to permit location of the satellites. The unit further includes a computer for computation of the wind velocity and position information.

BRIEF DESCRIPTION OF THE DRAWINGS

A written description setting forth the best mode presently known for carrying out the present invention, and of the manner of implementing and using it, is provided by the following detailed description of an illustrative embodiment represented in the attached drawings herein.

DETAILED DESCRIPTION OF AN ILLUSTRATIVE EMBODIMENT OF THE PRESENT INVENTION

Figure 1:
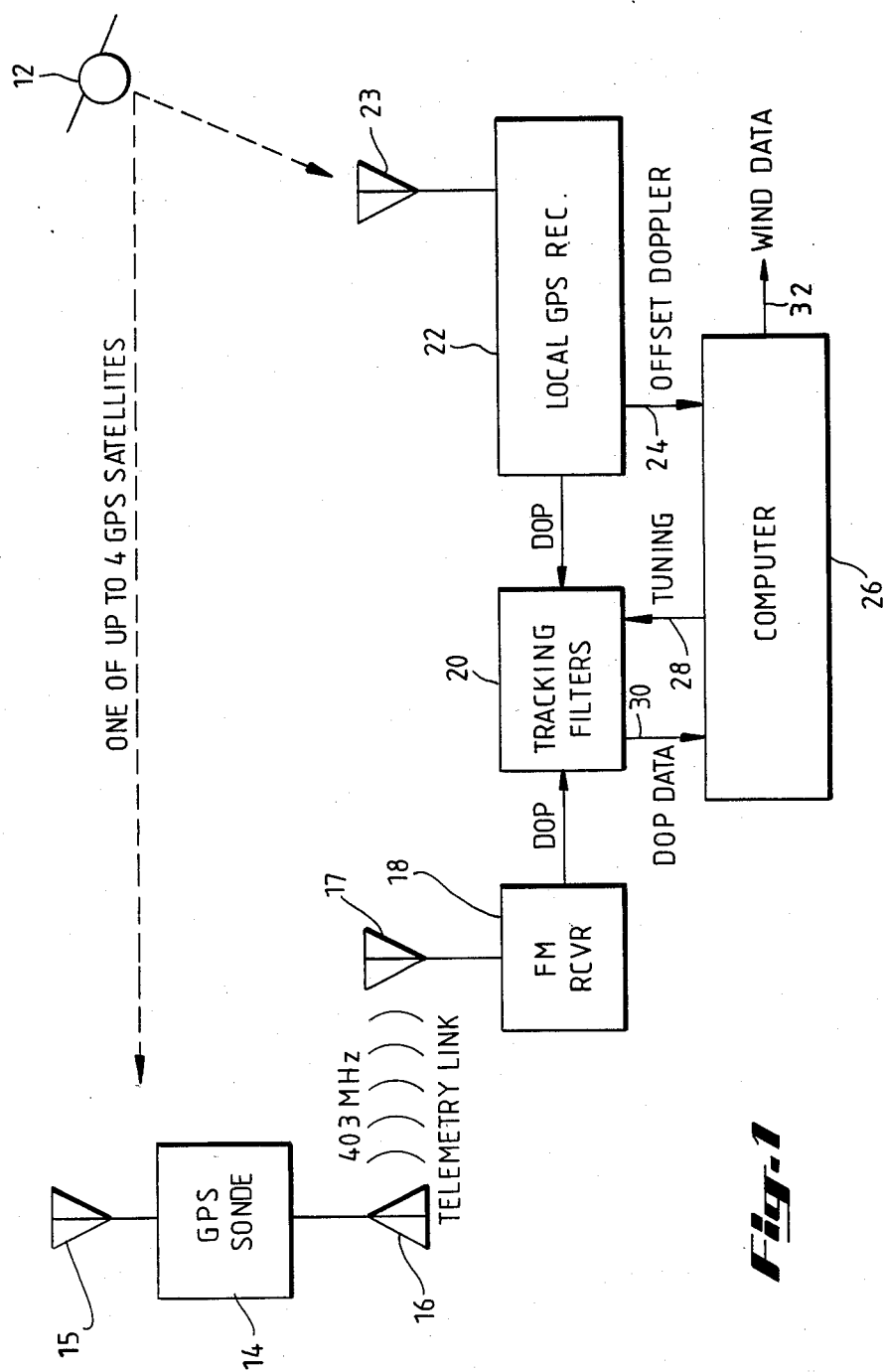
FIG. 1 is an overall block diagram of a windfinding system in accordance with the present invention.

Referring to FIG. 1, there is diagrammed a windfinding system in accordance with the present invention. The system utilizes the signals emitted from satellites in the GPS system. In the diagram of FIG. 1, a satellite 12 is shown. As indicated, however, at least four GPS satellites would be in view from any earth location at a given time. Accordingly, signals from at least four GPS satellites would be received by the system receivers.

The windfinding system includes a balloon borne, remote sonde 14. An antenna 15 receives the GPS satellite signals and applies them to a codeless receiver. The receiver signals are processed and the doppler information applied to an FM transmitter of a telemetry link operating in the 403 MHz meteorology frequency band. At a ground location, an FM receiver 18 obtains the telemetry link signals from the sonde via antenna 17. The doppler information DOP signal is applied to tracking filters 20. The DOP signal input to the tracking filters will contain information concerning at least four satellite transmissions. Accordingly, there will be four tracking filters for the DOP signals obtained from the sonde.

The ground-based unit 21 will also include a local GPS receiver 22 having an antenna 23. Receiver 22 includes both a standard GPS receiver and a codeless receiver. The standard GPS receiver provides an output 24 of information concerning the offset doppler related to the change in position of the GPS satellites in view. The codeless receiver provides output DOP signals indicative of the change in satellite position. The DOP signals are applied to a separate set of four tracking filters. The standard GPS receiver may be one of the currently available commercial GPS receivers. A listing of some manufacturers having available standard GPS receivers may be found in the Apr. 19, 1986 issue of MICROWAVE JOURNAL. See also, U.S. Pat. Nos. 4,457,006 and 4,114,155.

The ground-based unit further includes a computer 26 receiving the offset doppler signal 24 from the standard GPS receiver. The computer provides a tuning input 28 to the tracking filters for the satellite DOP signals. The tracking filters are a narrow bandwidth, e.g., 1 Hz, tunable filter. The center frequency setting of the tracking filters is changed by computer tuning as the offset doppler signal 24 changes with satellite movement. The bandwidth of interest within which the tracking filters will be tuned is the 5–25 kilohertz band. The tracking filters for the remote sonde DOP signal are predictably tuned by the computer beginning from the time of release of the balloon borne sonde from the ground station location. Before release, the remote and local DOP signals will be tuned to the same center frequency. Thereafter, as the balloon sonde moves relative to the ground-based unit and as the GPS satellites move, the tracking filters are tuned to different frequencies. The offset in frequency of the remote DOP signal tracking filters from the local DOP signal tracking filters allows determination of the velocity of the sonde.

Based upon the inputs of the GPS satellite offset doppler, local position, and DOP data, computer 26 calculates the wind data output 32. This data includes a velocity vector and position for the remote sonde. The calculations for developing the wind data are documented in specifications for the NAVSTAR/GPS SYSTEM. These computations are outlined in the publication NAVSTAR/GPS Space Segment/Navigation User Interfaces, ICD-GPS-200. This publication is available from the NAVSTAR GPS Joint Program Office, Airforce Space Division, P.0. Box 92960, Oldworld Postal Center, Los Angeles, Calif. 90009.

Computer 26 may be variously implemented. For example, the computer may be a microcomputer system based upon any of the presently available devices. Such devices include the Motorola 68000 microprocessor and associated memory chip set.

The DOP signal tracking filters may be implemented in either analog or digital circuitry. For example, digital signal processing may be utilized to implement a tunable filter function. A tracking filter may be implemented digitally by using, for example, devices such as the TMS320 single-chip processor available from Texas Instruments, Inc.

Figure 2:
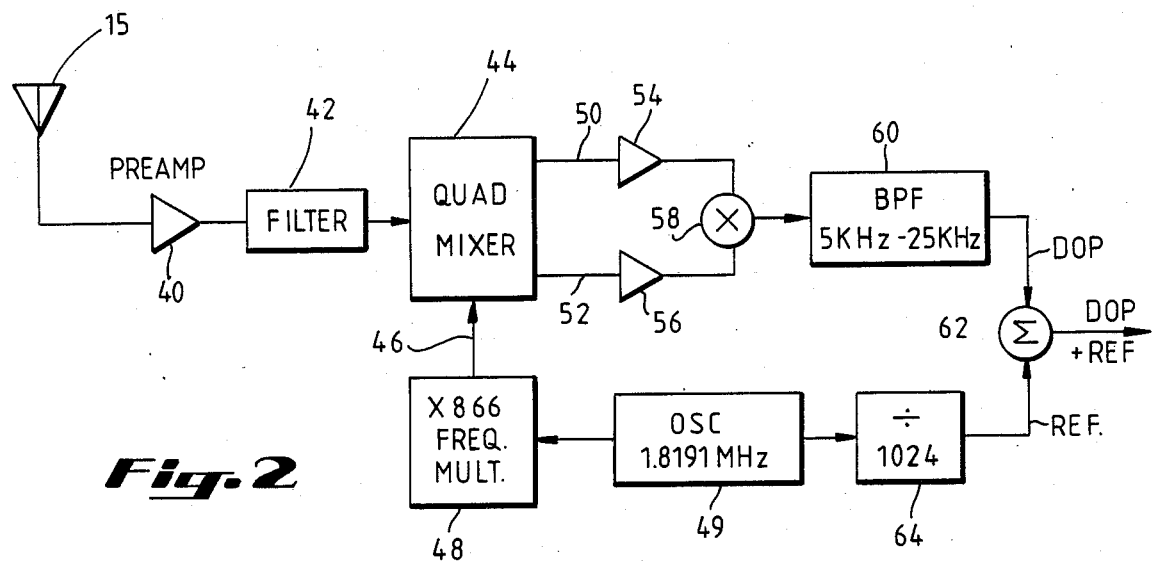
FIG. 2 is a block diagram of the codeless receiver used in the windfinding system.

Referring next to FIG. 2, there is diagramed the codeless receiver for the sonde 14 (and ground unit 21) of FIG. 1. Satellite signals at 1.57542 Gigahertz are obtained by antenna 15 and applied to a preamplifier 40. The amplifier output is applied to a filter 42. The filtered signal is applied to quadmixer 44. The mixer also receives an input 46 from frequency multiplier 48. Mixer 44 performs a frequency conversion with the difference in the two applied signal frequencies appearing at the two output ports 50 and 52. The two outputs are 90° out of phase and independent of frequency. The outputs of the quadrature conversion are passed through separate video amplifier channels 54 and 56. These amplifiers have a sufficient bandwidth to pass spread spectrum modulation components at baseband. The bandwidth required for the C/A code is 1.023 Megahertz. The signals at the output of the video amplifiers include noise and signal components. The signal components are 90° out of phase, but the noise components are noncorrelated.

The video amplifier output are multiplied by multiplier 58. The multiplication removes the spread spectrum code by implementing the trigonometric indenity:

$$\sin A \cos A = \tfrac{1}{2}\sin 2A$$

wherein the angle A is being modulated in steps of 180° degrees by the spread spectrum code. If enough bandwidth is maintained on the multiplier to pass the modulation the modulation is removed at the output, because sine and cosine wave are being multiplied in the following way:

| Quadrant | sine | | cosine | result |
| --- | --- | --- | --- | --- |
| 1 | + | × | + | + |
| 2 | + | × | − | − |
| 3 | − | × | − | + |
| 4 | − | × | + | − |

Thus, if the signal phase is in the first quadrant, there is a (+x+) or positive result. When the code causes a sudden shift of 180°, the signal phase is shifted to the third quadrant where the result would be the same sign (−x−) or positive. With the signal in quadrant two, there is a negative result (+x−). When the code shifts 180° to place the signal in quadrant four the same negative result is obtained (−x+).

Thus, multiplication of the video amplifier output signals removes the 180° spread spectrum code from the GPS carrier frequency. The signal at the output of the multiplier is bandpass filtered in filter 60. The bandwidth of the filter will pass two times the expected doppler frequency shift due to the satellite motion. The doppler shift of satellite signals is approximately +/−5 kilohertz. This permits the bandwidth to be reduced to 20 Kilohertz for transmission to the ground station unit.

The output DOP signal may be transmitted directly to the ground unit. However, it is believed advantageous to sum the DOP signal with a reference signal. Accordingly, a summer 62 is provided for summing the DOP signal from filter 60 and a reference signal. The reference signal is obtained by dividing down the output frequency of oscillator 49 by a divider circuit 64. As indicated, the oscillator frequency is 1.8191 Megahertz. This frequency is divided by 1024 to provide a 17.76 Kilohertz signal to be summed with the DOP signal. The reference signal provides a means to directly measure the frequency errors caused by the 1.8191 MHz crystal oscillator. The measurement of this error on the around, allows the sonde oscillator to be a low cost unit. The output of summer 62 is transmitted by the FM telemetry link to the ground unit.

In a preferred embodiment, the bandwidth of the video amplifiers 54 and 56 is 1 Kilohertz to 1 Megahertz. The frequency multiplier 48 multiplies oscillator 49 output by 866 to provide the local oscillator signal 46 to quadmixer 44. The quadmixer 44 may be implemented by a model IRM-55053, S/N992 available from Merrimac of West Caldwell, N.J. The oscillator and frequency multiplier may be implemented by a phase locked-loop circuit.

Further, it is contemplated that the preamp 40, filter 42, quadmixer 44 and frequency multiplier 48 would be formed in an integrated circuit package rather than in discrete components. Adding the reference signal provides information concerning offset error, which is a function of oscillator error. With the reference information, the ground unit can correct for offset caused by the oscillator.

Figure 3:
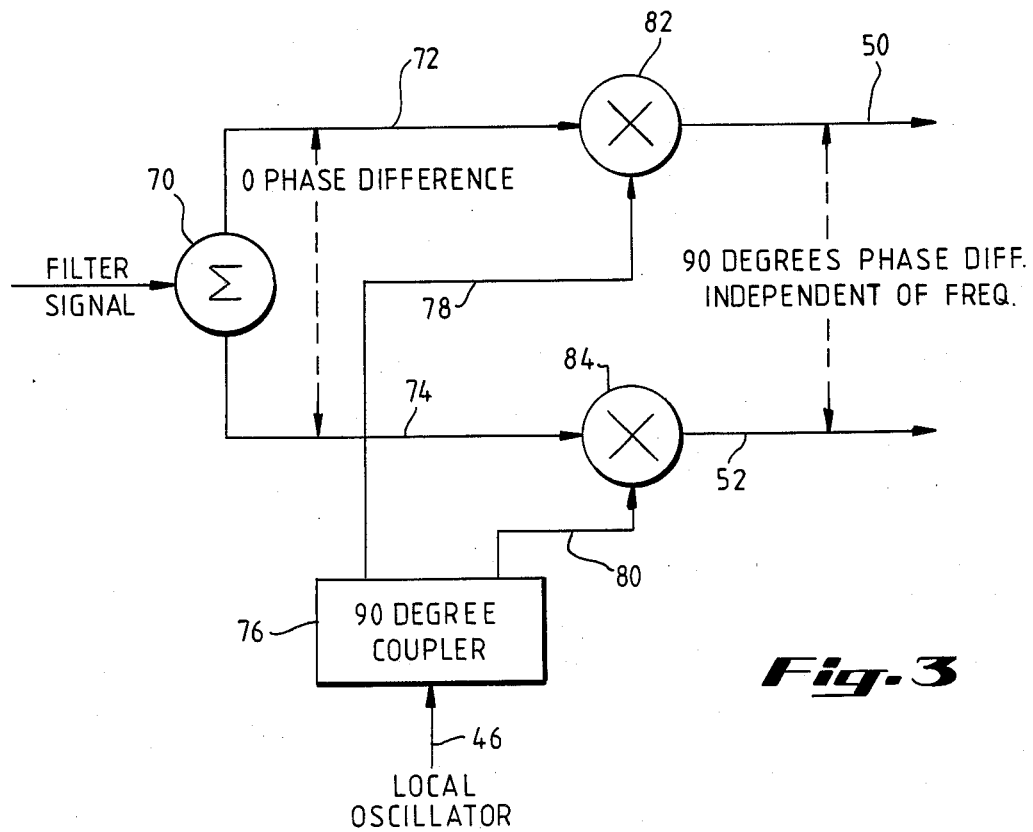
FIG. 3 is a block diagram of the quadrature mixer of the codeless receiver.

Referring briefly to FIG. 3, there is a general diagram of the quadrature mixer. As shown, the filtered satellite signal is applied to a splitter 70 which divides the signal into two signal paths 72 and 74. There is no phase difference between the signals. The local oscillator signal from frequency multiplier 48 is applied to a 90° coupler 76 which provides signals over signal paths 78 and 80, which are 90° out of phase. The local oscillator signal on line 78 is multiplied with the signal in path 72 by multiplier 82 to provide one of the quadmixer outputs. In similar fashion, the local oscillator signal on signal path 80 is multiplied with the signal on signal path 74 by multiplier 84 to provide the other quadmixer output.

Figure 4:
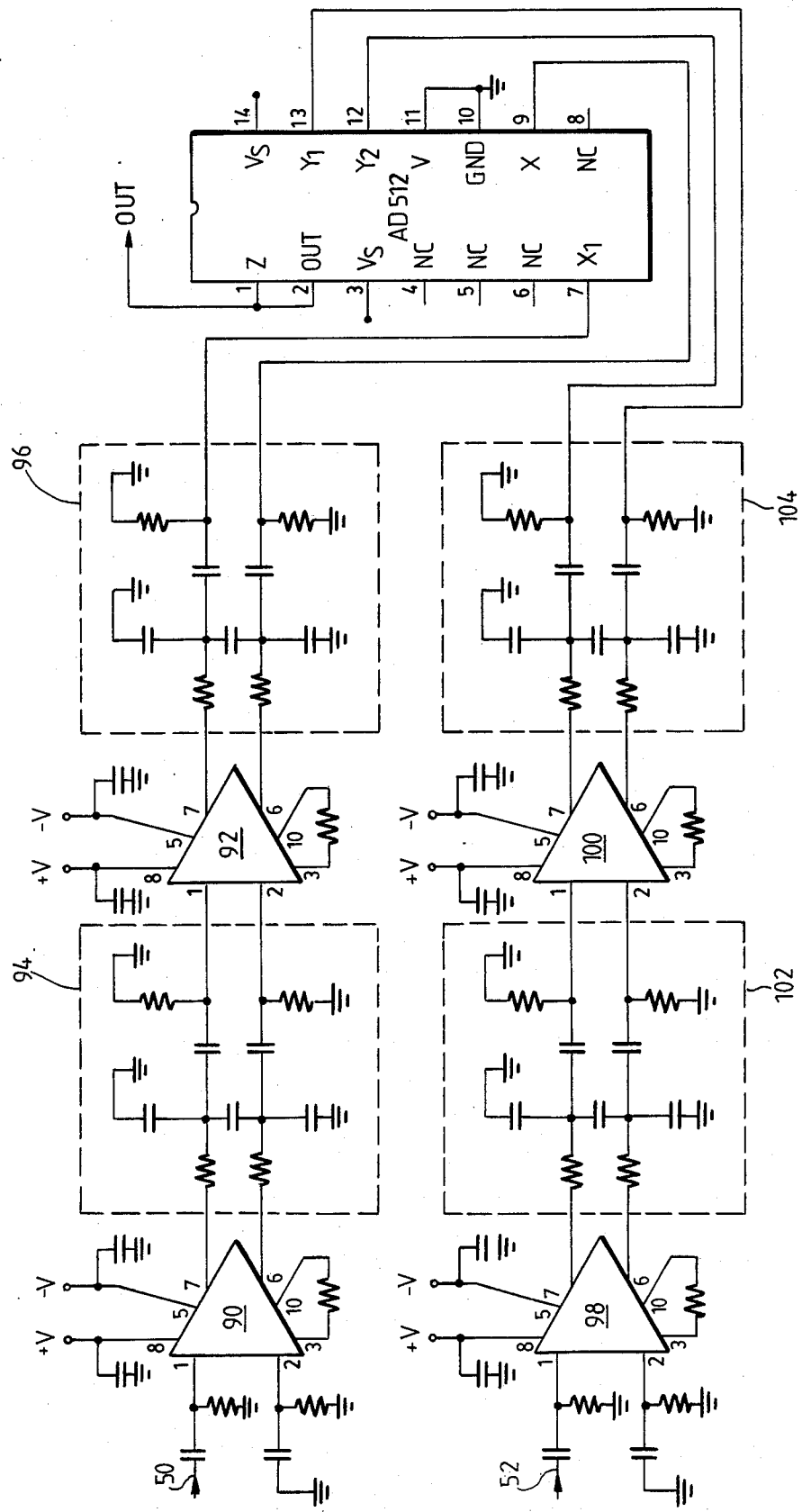
FIG. 4 is a schematic diagram of the video amplifiers and multiplier of the codeless receiver.

Referring now to FIG. 4, circuitry is schematically diagrammed for the video amplifier channels 54 and 56 and the multiplier 58. Video amplifier channel 54 receives the quadmixer output over line 50. The video amplifier channel 54 includes two stages of amplification provided by integrated circuit amplifiers 90 and 92. These devices may suitably be Signetics MC733CL devices. At the output of each amplification stage is a filter network. These filter works are indicated by the reference designations 94 and 96. Video amplifier channel 56 for output 52 of the quadmixer is implemented similarly to channel 54. Two stages of amplification 98 and 100 are utilized. Also, there are filter networks 102 and 104 in the signal channel. The outputs of the video amplifier channels are applied to a multiplier device which may suitably be implemented by an XR2208 multiplier device.

The codeless receiver utilized in the local GPS receiver 22 of FIG. 1 corresoonds to the structure of that described in connection with FIGS. 2–3.

The codeless receiver utilized in the present invention is advantageous because of its low cost. Further, the accuracy of the system employing the receiver is extremely good because of the high carrier frequency of the GPS satellite signals and the doppler frequency doubling in the codeless receivers. A one meter per second velocity difference will yield up to a 10 hertz difference frequency. While the codeless receiver is disclosed in connection with a windfinding system, it is to be understood that the receiver may have beneficial application in diverse situations including ground-based, water-based and airborne operations involving surveying, vehicular tracking, navigation and position finding.

While there has been described and illustrated one specific embodiment of the invention, it should be clear that variations in the detailed embodiment specifically illustrated and described may be made without departing from the scope of the invention as defined in the appended claims.

What is claimed is:

1. A spread spectrum codeless receiver for reception of direct sequence spread spectrum signals without knowledge of the spreading code therein, comprising:
   a quadrature mixer for accepting an input direct sequence spread spectrum signal and a local oscillator signal, for conversion of the baseband signals of the input signal to first and second quadrature signals;
   first and second video amplifier channels coupled to the quadrature mixer and providing first and second amplified signals, said amplifiers having a bandwidth that passes the spreading code of the input signal; and
   a multiplier circuit for multiplying the amplified signals to remove the spreading code therefrom and produce a signal representing the doppler offset of the carrier of the input signal.

2. The receiver of claim 1 wherein the multiplier circuit is a four quadrant multiplier circuit.

3. The receiver of claim 1 wherein the multiplier circuit produces an output signal that is two times the frequency of the doppler offset.

4. The receiver of claim 1 further comprising:
   an oscillator circuit providing a local oscillator signal for the mixer;
   a divider circuit coupled to the oscillator circuit for providing a reference signal divided-down in frequency from the frequency of the local oscillator signal; and
   a summing circuit coupled to the divider circuit and the multiplier circuit, for combining the doppler offset signal and the reference signal.

5. The receiver of claim 1 wherein the quadrature mixer comprises a splitter for providing separation of the input signal into two signals of the same phase; a 90° coupler for providing separation of the local oscillator signal into two signals having 90° phase difference; a first multiplier circuit for multiplying one of the input signals and one of the local oscillator signals; and a second multiplier circuit for multiplying the other input signal and the other local oscillator signal.

6. A windfinding sonde for airborne deployment, comprising:
   an antenna for receiving direct sequence spread spectrum carrier transmissions;
   an amplifier coupled to the antenna for providing a direct sequence spread spectrum signal for processing as an information signal;

a quadrature mixer for accepting the information signal produced by the amplifier and accepting a local oscillator signal, for conversion of the baseband signals of the information signal to first and second quadrature signals;

first and second video amplifier channels coupled to the mixer and having sufficient bandwidth to pass the spreading code of the information signal;

a multiplier circuit for multiplying the signals passed by the first and second video amplifier channels to remove the spreading code and produce an output signal representing the doppler offset of the carrier transmissions; and a transmitter for transmission of the doppler offset output signal to a remote location from the sonde.

7. A windfinding system, comprising:

a first codeless receiver adapted to be carried by a balloon sonde having a telemetry link transmitter, said receiver accepting a direct sequence spread spectrum input signal transmission and producing a signal for transmission over the telemetry link representing the doppler offset of the carrier of the input signal by removing the spreading code and recovering the carrier of the input signal;

a ground-based unit including a telemetry link receiver for acquiring the sonde transmission and providing a first doppler offset signal, and a second codeless receiver accepting the direct sequence spread spectrum input signal transmission and producing a signal representative of the doppler offset of the carrier of the input signal by removing the spreading code and recovering the carrier of the input signal; and a computer for determining the difference in doppler offset frequency of the first and second doppler offset signals and calculating wind data including a velocity vector of the sonde.

8. The system of claim 7, further comprising:

a first tracking filter for the first doppler offset signal;

a second tracking filter for the second doppler offset signal; and each tracking filter providing a measure of the doppler offset frequency of its respective doppler offset signal.

9. The system of claim 7 wherein the first and second codeless receivers are adapted to process GPS satellite signals.

10. A windfinding system operable based upon direct sequence spread spectrum transmissions from GPS satellites, comprising:

a first codeless receiver adapted to be carried by a balloon sonde having a telemetry link transmitter;

said receiver accepting the GPS satellite transmission and producing a signal for transmission over the telemetry link representing the doppler offset of the carrier of the GPS transmission by removing the spreading code and recovering the carrier;

a ground-based unit including a telemetry link receiver for acquiring the sonde transmission and providing a first doppler offset signal;

a second, ground-based codeless receiver accepting the GPS satellite transmission and producing a signal representing the doppler offset of the carrier of the GPS transmission as a second doppler offset signal by removing the spreading code and recovering the carrier;

a standard GPS receiver receiving the GPS satellite transmission and providing information concerning satellite transmission offset doppler; and a computer for calculating wind data including a sonde velocity vector based upon the first and second doppler offset signals and the satellite transmission offset doppler information.

11. A system operable based upon GPS satellite transmissions to determine the velocity vector of a remote unit, comprising:

a first codeless receiver adapted to be carried by a remote unit having a telemetry link transmitter;

said receiver accepting the GPS satellite transmission and producing a signal for transmission over the telemetry link representing the doppler offset of the carrier of the GPS transmission by removing the spreading code and recovering the carrier;

a second codeless receiver adapted to be stationed with a local unit having a telemetry link receiver for acquiring the remote unit transmission and providing the remote GPS doppler offset signal;

said second codeless receiver accepting the GPS satellite transmission and producing a signal representing the doppler offset of the carrier of the GPS transmission as a local GPS doppler offset signal by removing the spreading code and recovering the carrier; and a computer for calculating a remote unit velocity vector based upon the remote and local GPS doppler offset signals.

* * * * *